Aug. 25, 1925.  1,550,735
J. S. OGSBURY
SCALE
Filed July 25, 1921  5 Sheets-Sheet 1

Aug. 25, 1925.

J. S. OGSBURY 1,550,735

SCALE

Filed July 25, 1921    5 Sheets-Sheet 2

Inventor
James S Ogsbury
By his Attorneys
Kerr Page Cooper & Hayward

Aug. 25, 1925.

J. S. OGSBURY 1,550,735

SCALE

Filed July 25, 1921  5 Sheets-Sheet 3

Inventor
James S. Ogsbury
By his Attorneys
Kerr Page Cooper & Hayward

Aug. 25, 1925.  
J. S. OGSBURY  
SCALE  
Filed July 25, 1921
1,550,735
5 Sheets-Sheet 4
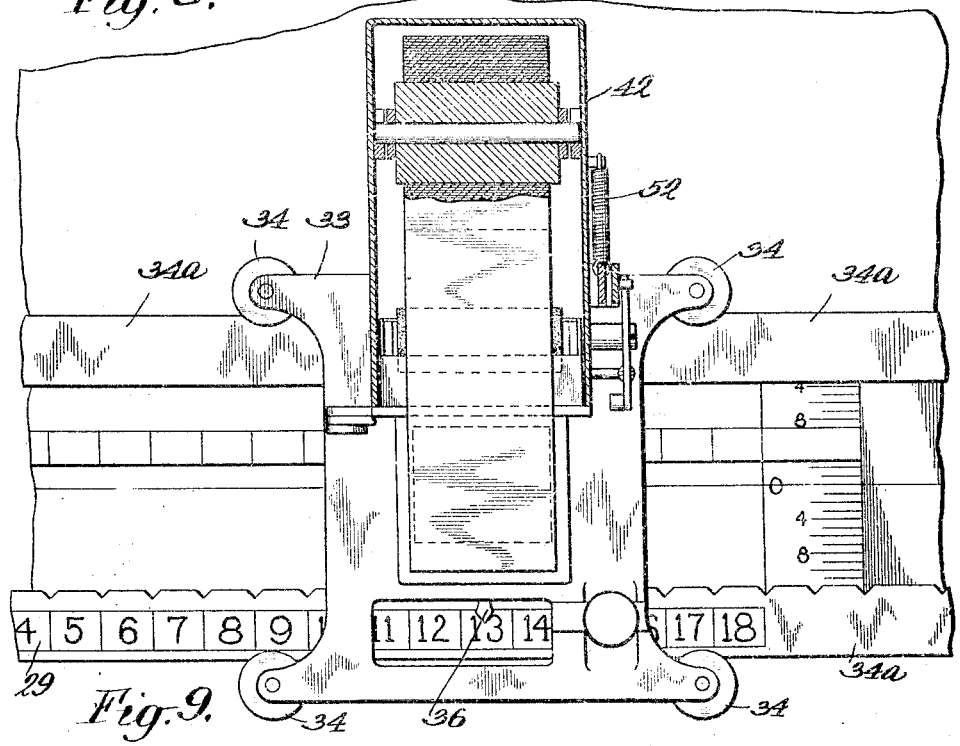
Fig. 8.
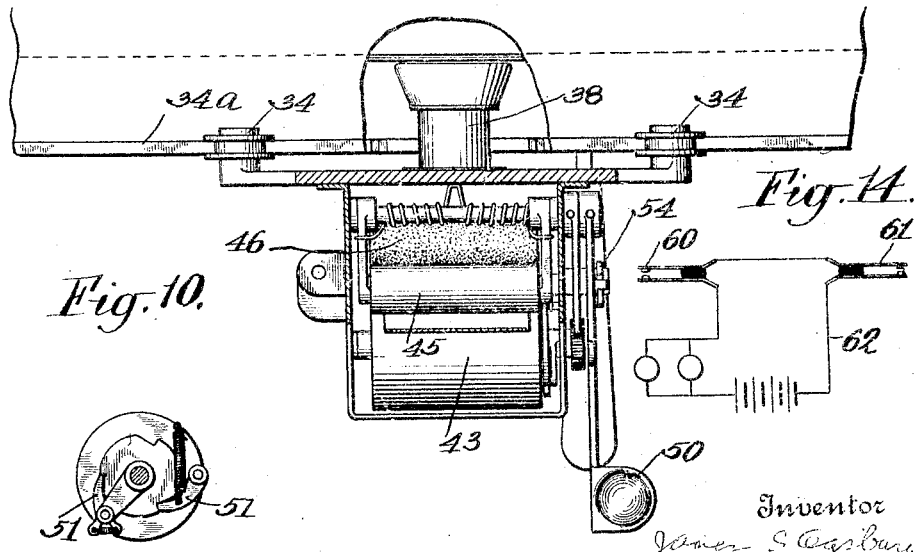
Fig. 9.
Fig. 10.
Fig. 14.
Inventor  
James S. Ogsbury  
By his Attorneys  
Kerr Page Cooper & Hayward Aug. 25, 1925.

J. S. OGSBURY 1,550,735

SCALE

Filed July 25, 1921

Inventor
James S. Ogsbury
By his Attorneys
Kerr Page Cooper & Hayward

Patented Aug. 25, 1925.

1,550,735

UNITED STATES PATENT OFFICE.

JAMES S. OGSBURY, OF HAWORTH, NEW JERSEY, ASSIGNOR, BY MESNE ASSIGNMENTS, TO DAYTON SCALE COMPANY, OF DAYTON, OHIO, A CORPORATION OF NEW JERSEY.

SCALE.

Application filed July 25, 1921. Serial No. 487,243.

*To all whom it may concern:*

Be it known that I, JAMES S. OGSBURY, a citizen of the United States of America, residing at Haworth, county of Bergen, State of New Jersey, have invented certain new and useful Improvements in Scales, of which the following is a full, clear, and exact description.

In the weighing scale art, and particularly in computing scales, it has long been recognized that a printed record of weight and related items such as prices would be desirable. However, the problem of providing a recorder for a weighing scale which would accurately print the weight or related price without interfering with the accuracy of the scale has been one of such magnitude that comparatively few devices of this sort have been commercially developed. The provision of a recorder which would accurately handle the widely varying multiplication problems required in a computing scale involving a number of prices per unit of weight, has further complicated the design of such an apparatus. Difficulty has been experienced in the attempts to operate recorders in accordance with the operation of a scale, since the scale itself has very little power, and the slightest load thereon interferes with the accuracy of the weighing. Furthermore, the scale movements at times are comparatively minute, and these comparatively small increments of movement each represent several cents of value when multiplied by the price per unit of weight.

According to the present invention I entirely avoid the attempted positioning of recorder parts mechanically in accordance with the displacement of the scale parts, and utilize a small camera-like device for optically taking the desired price or weight reading from the weight set part. The camera device is mechanically disassociated from the weight set parts of the scale so as not to interfere with their movements under the applied load. Associated with the camera device is a suitable supply of light sensitive paper which is adapted to receive the reading which is optically projected from the weight set part. This paper after proper exposure is withdrawn from the machine and handed to the customer and serves as a ticket showing either the amount of the purchase or the weight of the goods, or both.

Other objects of the invention will be set forth in the accompanying specification and shown in the drawings, which by way of exemplification show certain embodiments of the invention.

In the drawings,

Fig. 8 is an enlarged detail front and partly sectional view of certain of the parts shown in Fig. 2.

Fig. 9 is a detail sectional view taken on line 9—9 of Fig. 4.

Fig. 10 is a detail view of the feeding pawl devices.

Fig. 14 is a circuit diagram showing the control for the light circuit.

Figure 1:
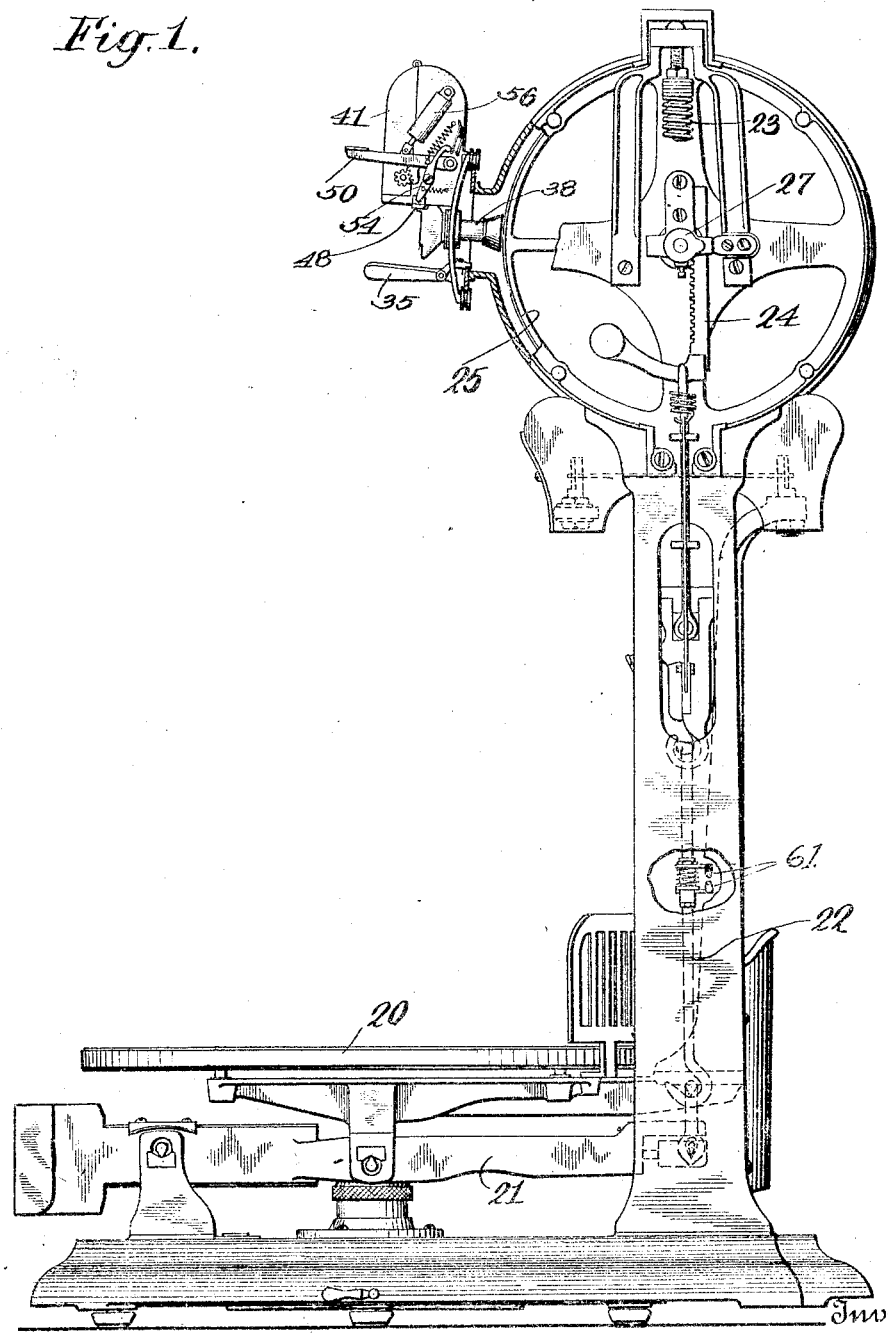
Fig. 1 shows an end elevation of a scale embodying my improvement.
Figure 3:
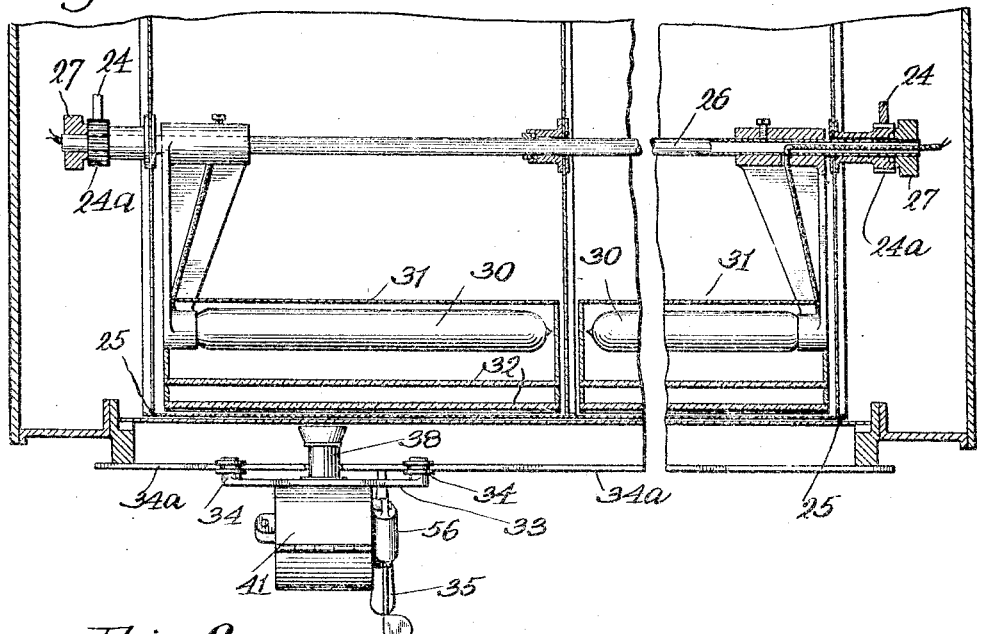
Fig. 3 shows a horizontal sectional view of the chart and associated parts.
Figure 2:
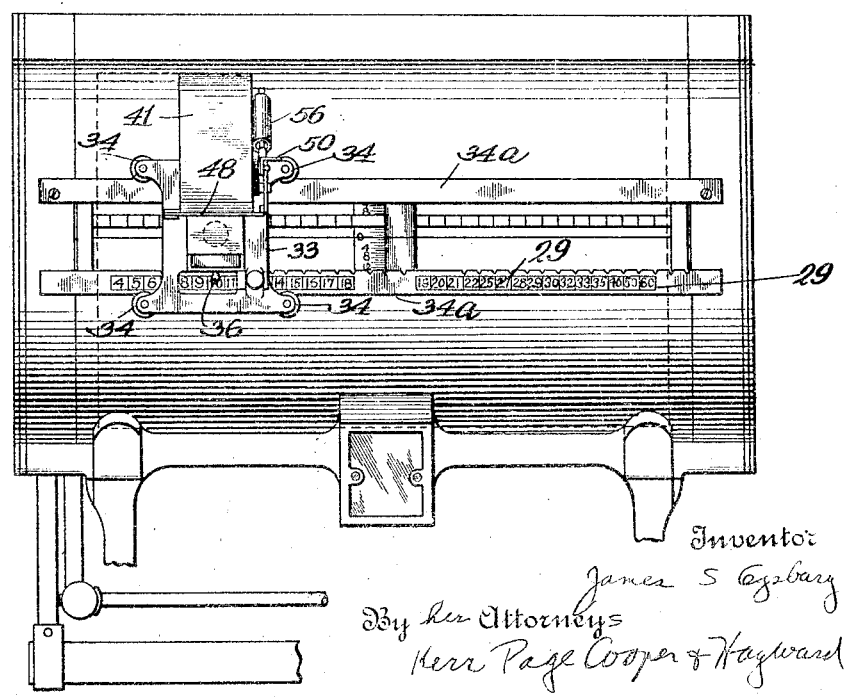
Fig. 2 is a front elevation of the upper housing and associated parts.
Figure 4:
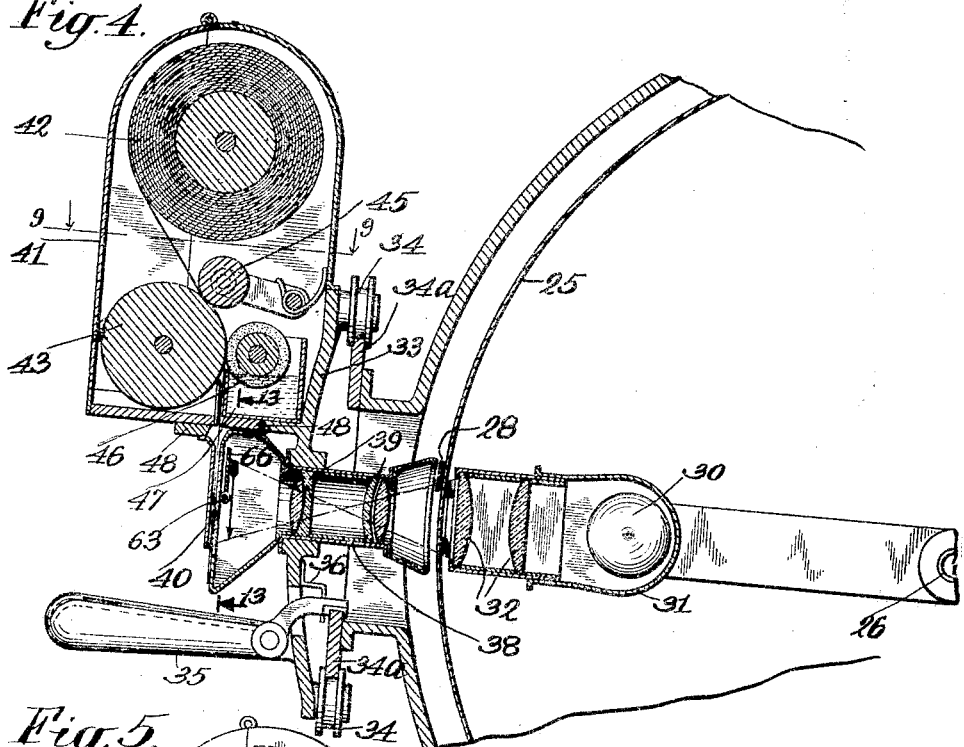
Fig. 4 is an enlarged vertical sectional view of the chart and reading device.
Figure 5:
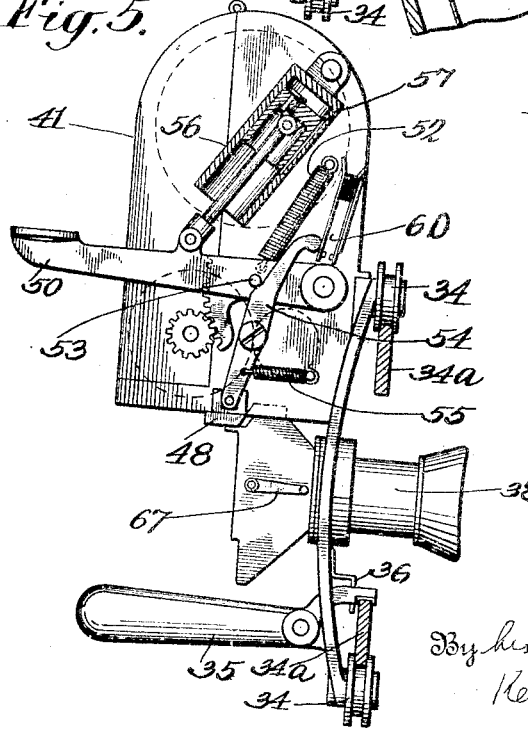
Fig. 5 is a detail end view of the reading device, with certain parts shown in section.

As an exemplification of one embodiment of my invention, I have shown the camera device in combination with a so-called drum type of computing scale. Various other types of scales may be used. Fig. 1 shows the weighing scale, which comprises a platform 20 supported upon the usual base lever 21 which is fulcrumed at its forward end, and at the rear is connected to a steelyard 22. The steelyard, through the usual operating connections, is connected to automatic counterbalancing means, such as springs 23, and to racks 24, which through pinions 24$^a$ drive a chart 25 of the drum type. This chart is preferably mounted to rotate about a hollow shaft 26 which is suitably supported at the ends by means of brackets 27.

Computing charts, such as are commonly used on scales of this type, comprise a number of columns of prices and graduation lines corresponding to different prices per pound, and also are provided with a weight column, with suitable numerals and graduation lines. The chart here shown is arranged in a similar manner, except that the figures are upon the inside of the chart instead of upon the outside periphery. This arrangement is used with the embodiment shown in Figs. 1 to 9, since in this embodiment the projection of values is secured by light passing through the chart. In the embodiment shown in Fig. 12, where projection is by reflection, I may dispose the figures and numerals upon the outside of the chart without the inversion of the resulting numerals on the check. Disposed adjacent the chart I provide a price per pound scale 28. This scale is graduated with bold numerals upon the inside corresponding with the usual price scale 29 which is visible to the operator. In the embodiment shown in Figs. 1 to 9 the chart is preferably made as transparent as possible to permit the light from a source of light 30 to pass through the chart and price scale. In order to intensify the light as much as possible I preferably provide a suitable reflector 31 and lenses 32. Parts 30, 31 and 32 are preferably supported upon arms carried by the hollow shaft, and current is supplied by flexible cables which pass through the interior of the shaft.

In order to take a reading of price or weight from the chart I provide a reading device, the framework 33 of which is mounted by means of rollers 34 upon tracks 34ª. The reading device may be selectively brought into cooperation with any desired price column, or the weight column, by means of a handle 35 which is provided with a suitable latch to engage in notches in the price bar and lock the reading device at a point opposite the desired column. A suitable indicator such as a pointer 36 travels with the reading device over price scale 29, and indicates to the operator the price or weight column with which the device is in alignment.

In the embodiment shown in Figs. 1 to 9, the frame 33 carries a tube 38 extending into proximity with the chart and price scale 29. Within the tube are suitable lenses 39 which project the image and magnify it if desired upon the sensitive paper, which passes through a guide chute 40 at the front of the tube. The sensitive paper which I prefer to use in connection with this apparatus is paper provided with a light sensitive emulsion which is sensitive only when wet. No developer is required. This paper per se is not part of my invention.

A convenient method of handling this paper and bringing it to a position to be exposed, cut off, and delivered, will now be described. The frame 33 carries a suitable housing 41 (Fig. 4) having a hinged cover to permit the reloading. The paper is preferably carried upon a supply roll 42 which is rotatably mounted in the housing 41. From the supply roll the paper passes downwardly between feed roll 43 and presser roll 45, past a moistening or activating roll 46 which is preferably covered with an absorbing covering to carry water or other proper liquid to activate the emulsion from a tank 47 into which the roller dips. The paper after passing the activating roll is fed downwardly past cutting knives 48 and into the chute 40.

In order to feed the paper, to time the exposure thereof, and to cut off the check, I provide a finger lever 50 pivoted upon the side of the housing. This lever when depressed is adapted to turn feeding pawls 51 (see Fig. 10) forwardly and thereby turn the feed roll 43 and advance the desired amount of paper into the exposure chute. A spring 52 restores the finger lever, and during this return movement the pawl device 51 permits the feed roll to remain stationary. Just at the end of the return movement of the finger lever, a pin 53 carried thereby rides off a shoulder upon the knife actuating lever 54 and allows the latter to be moved by a spring 55 to close the knife and cut off the paper. After the paper has been cut off the check is free to drop or be removed by the operator from the open end of the chute 40.

Any suitable means may be provided for controlling the time of exposure. In the present embodiment I prefer to control the time of exposure both by the timing of the cutting off of the paper strip and by the timing of the light circuit. However, other well known means such as shutters may be used if desired. In the present embodiment I preferably secure such control of exposure by providing a dash pot 56 which is provided with a piston interconnected to the finger arm. The piston is valved to permit rapid downward and slow return movement of the finger arm, and I preferably provide a port 57 to permit the dash pot piston and interconnected piston to move back rapidly at the end of the return stroke. This rapid movement facilitates proper knife action. After the knives have cut off the paper the check drops out of the chute and thereby terminates the exposure of the check to the image received from the scale chart.

The control for the light circuit comprises any suitable draft rod contacts 61 which are adapted to be closed when the load is applied to the scale, and opened when the load is removed. Contacts 60 are normally open and are closed upon depression of the finger lever. Both of these contacts are disposed in the light circuit 62 and maintain the current on until the finger arm is restored to normal position.

Figure 6:
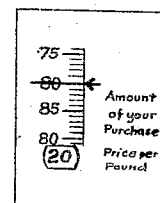
Figs. 6 and 7 show sample checks as made by the machine.
Figure 7:
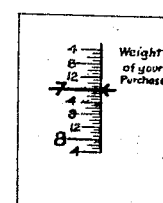
Figure 13:
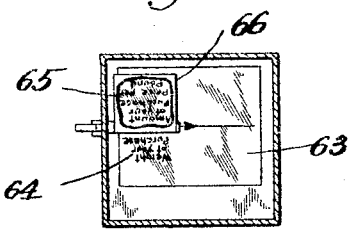
Fig. 13 is a detail sectional view taken on line 13—13 of Fig. 4.

If a price check is being made, it is desirable that a certain wording indication be shown thereon (see Fig. 6). If the weight column is selected it is desirable that the wording shown in Fig. 7 appear upon the check. To secure these results I provide the chute with a glass wall 63 having a portion opaque with cut out figures thereon as shown in Fig. 13, at 64 and 65. These sets of openings are selectively covered or uncovered by means of a shutter 66 which may be manipulated by means of a small handle 67. The glass plate 63 also affords a convenient place for the reading arrow or reading line.

Figure 12:
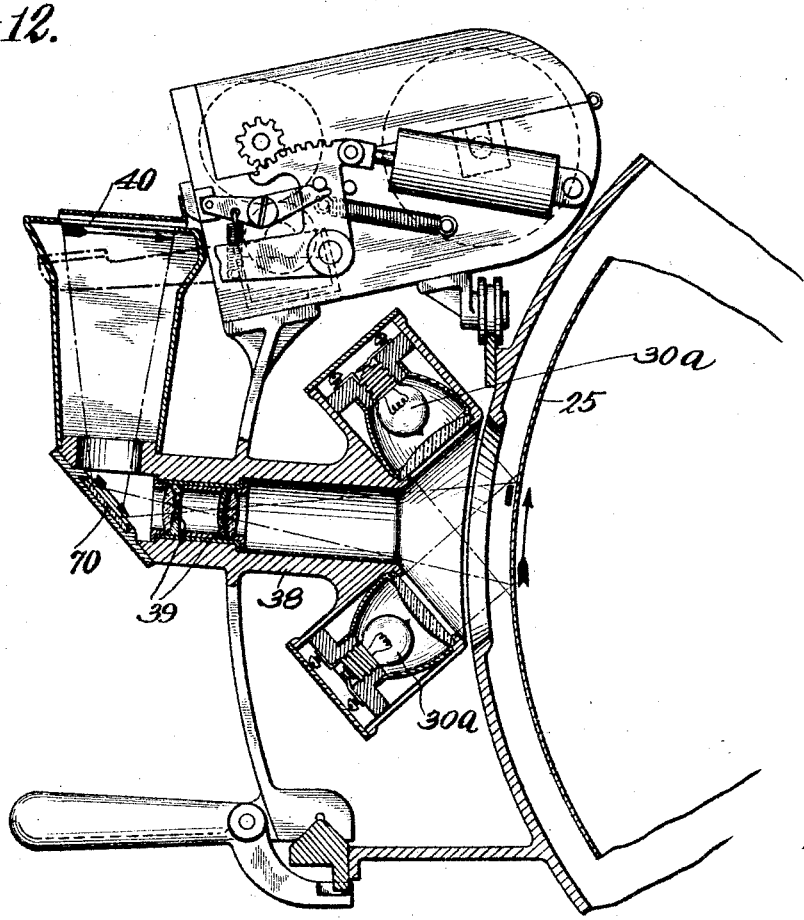
Fig. 12 is a detail vertical sectional view of a modification.
Figure 11:
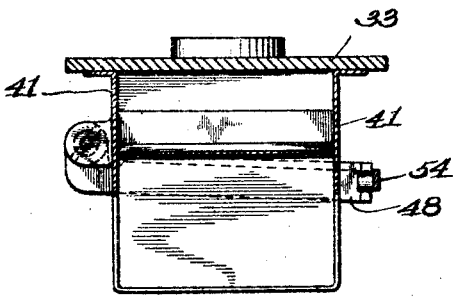
Fig. 11 is a detail view of the cutting knife.

In the direct reflecting embodiment shown in Fig. 12 the general arrangement is the same as for the previously described structure. Here, however, I provide a source of illumination without the chart such as lights 30ª. The lights may preferably be carried in the tube 38 and are provided with suitable reflectors and lenses. The reflected image passes the lens 39 and is directed upon a reflecting mirror 70 which reflects the image upon the sensitized and activated paper which is carried by the horizontally disposed chute 40.

It will be understood that by suitably printing the chart a record of both weight and price may be printed upon each check. However, since this arrangement reduces the chart capacity in the number of prices that can be shown, I therefore prefer the embodiment in which a separate weight and price check is recorded.

What I claim is:

1. In a weighing scale, in combination with a chart and load support and means for displacing said chart in accordance with the load applied to said support, means for projecting an image from said chart upon a sheet of light sensitive paper, and means for feeding said paper to image receiving position and for thereafter cutting off the paper and forming a check bearing weight related data photographically recorded thereon.

2. In a weighing scale, in combination with a chart and load support, means for moving the former in accordance with the loads applied to the latter, means for projecting the chart image, a supply of light sensitive paper, means for feeding a portion of said paper to image receiving position, and means for delivering the check after the exposure of the chart image has been properly recorded upon the paper.

3. In a weighing scale, in combination, a load support, a chart and means for controlling the displacement of the same in accordance with the applied load upon said load support, means for optically projecting a chart image, a supply of light sensitive paper, means for feeding the said light sensitive paper to image receiving position, and means for thereafter delivering the exposed paper with a photographic record of the chart image thereon in an accessible position without the machine.

4. In a weighing scale, in combination, a load support, and a chart operatively controlled and displaced in accordance with the load applied thereto, a reading device adapted to receive an image of said chart reading when thus displaced and to direct said image upon a record sheet, means for advancing a light sensitive record sheet into image receiving position, and means for effecting delivery of the exposed sheet after a predetermined time.

5. In a weighing scale, in combination, a load support, a chart bearing weight related data, means for displacing the chart in accordance with the applied load upon the load support, a source of light and means for directing the light upon the chart, means for projecting the illuminated chart image upon a sheet of light sensitive paper, and means for delivering the check bearing the photographically recorded image after the exposure is completed.

6. In a weighing scale, in combination, a load support, a chart and means for displacing the same to indicate by its extent of displacement the amount of load upon said support, a source of light and means for directing the same upon the chart, a plurality of columns of weight related data upon said chart, a reading device and means for selectively adjusting the same into alignment with any selected column on said chart, and means associated with the reading device for directing the illuminated portion of the selected column upon a sheet of sensitized paper and thereby imprinting thereon a record of the chart reading.

7. The invention set forth in claim 6 in which means is provided for directing an identifying image for the particular column of the chart which is selected upon said sensitized sheet and thereby making an identifying record thereon of the selected column.

8. A weighing scale comprising means for weighing the goods to be weighed, a supply of light sensitive paper, means controlled by the aforesaid means for optically directing an image of weight related data upon a portion of said light sensitive paper, means for controlling the time of exposure of said image, and means for delivering a severed section of said paper, bearing said weight related image, after the exposure has been completed.

9. The invention set forth in claim 8 in which means is provided for selecting the weight related data to be reproduced whereby different data relating to the same weight may be reproduced upon the light sensitive paper.

10. A computing scale comprising in combination, a load support, a chart having a plurality of sets of indications, a reading device, manually operable means for selectively displacing said reading device into cooperation with the desired set of indications, means in said reading device for receiving an image projected optically from said chart upon a sheet of light sensitive paper, and means controlled by the load support for distinctively disclosing a portion of any selected set of said indications in accordance with a function of the weight of a commodity whereby said disclosed portion will be optically projected through the reading device.

In testimony whereof I hereto affix my signature.

JAMES S. OGSBURY.